United States Patent [19]
Chang

[11] Patent Number: 6,016,909
[45] Date of Patent: Jan. 25, 2000

[54] COMPACT DISK RECEIVING DEVICE

[76] Inventor: Kun-Fa Chang, No.14, Jenn Hsing Road, Da Ya Hsiang, Taichung Hsien, Taiwan

[21] Appl. No.: 09/241,114

[22] Filed: Feb. 1, 1999

[51] Int. Cl.[7] .................................................. B65D 85/57
[52] U.S. Cl. ...................... 206/310; 206/308.1; 206/307; 206/493
[58] Field of Search .................. 206/308.1, 309, 206/307, 310, 493, 232

[56]  References Cited

U.S. PATENT DOCUMENTS

| | | | |
|---|---|---|---|
| 4,874,085 | 10/1989 | Grobecker et al. | 206/310 |
| 5,402,882 | 4/1995 | Bandy et al. | 206/310 |
| 5,727,680 | 3/1998 | Liu | 206/308.1 |
| 5,788,068 | 8/1998 | Fraser et al. | 206/310 |
| 5,845,771 | 12/1998 | Fu | 206/308.1 |
| 5,848,689 | 12/1998 | Mueller | 206/308.1 |
| 5,887,713 | 3/1999 | Smith et al. | 206/308.1 |
| 5,894,924 | 4/1999 | Koch | 206/310 |
| 5,899,327 | 5/1999 | Sykes | 206/308.1 |
| 5,944,181 | 8/1999 | Lau | 206/308.1 |
| 5,950,822 | 9/1999 | Cloran et al. | 206/310 |

*Primary Examiner*—Paul T. Sewell
*Assistant Examiner*—Anthony Stashick
*Attorney, Agent, or Firm*—Charles E. Baxley, Esq.

[57]  ABSTRACT

A compact disk receiving device includes a base plate with a circular flange extending therefrom which has a lip portion extending radially inward therefrom so as to engage with two engaging plates extending from the bottom of an engaging member which is rotatably mounted to the circular flange. Two hook members extending radially outward from the flange and which are pushed outwardly and downwardly by the long side of the engaging member when rotating the engaging member so as to compress a compact disk mounted onto the flange.

3 Claims, 3 Drawing Sheets

COMPACT DISK RECEIVING DEVICE

FIELD OF THE INVENTION

The present invention relates to a compact disk receiving device, and more particularly, to an improved compact disk receiver having a circular flange extending from the base plate and two hook members extending radially outward therefrom, a rectangular engaging member rotatably engaged with the flange and pushing the hook members to compress the compact disk by the long side of the engaging member.

BACKGROUND OF THE INVENTION

A conventional compact disk receiving device is shown in FIG. 1 and includes a base plate (10) and a cover (100) which is pivotally connected to the base plate (10). The base plate (10) has twelve plates (11) extending inclinedly from the top surface thereof and are arranged as a circular ring shape. Each of the plates (11) has a pushing portion (13) extending laterally from the top thereof so as to define a space defined between the pushing portions (13) and the top surface of the base plate (10). Each of the plates (11) is made of flexible material so that the center aperture of a compact disk (not shown) can be securely engaged with the plates (10) and the compact disk is positioned. When compressing the pushing portions (13), the plates (11) are pushed downwardly inward, the diameter of the circular composed of the plates (11) is reduced so that the compact disk can be removed from the plates (11). It is experienced that when pushing the pushing portions (13), some of the pushing portions (13) could not be pushed so that it is slightly difficult to remove the compact disk from the plates (11). Furthermore, the plates (11) could be broken if the force pushing the pushing potions is too large and the compact disk could also be damaged.

The present invention intends to provide an improved compact disk receiving device which has an engaging member rotatably engaged with a circular flange extending from the top surface of the base plate. Two hook portions extend radially outward from the flange and are operated to compress or release the compact disk mounted to the flange by rotating the engaging member.

SUMMARY OF THE INVENTION

In accordance with one aspect of the present invention, there is provided a compact disk receiving device comprising a base plate with a cover pivotally connected thereto and a circular flange extending from the top of the base plate. The flange has two hook members respectively extending radially outward therefrom and a lip portion extending radially inward from the inner periphery of the circular flange. An engaging member is rotatably engaged with the circular flange by engaging two engaging plates extending from the bottom thereof with the lip portion of the flange. The engaging member has a long side and a short side, wherein the length of the long side is longer than the distance between the two hook portions, and the length of the short side is shorter than the distance between the two hook portions.

The object of the present invention is to provide an engaging device which is rotated to push two hook members to compress the compact disk mounted to the circular flange on the top of the base plate. The two hook members are ensured to be released from the compact disk when rotating the engaging member in the opposite direction.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
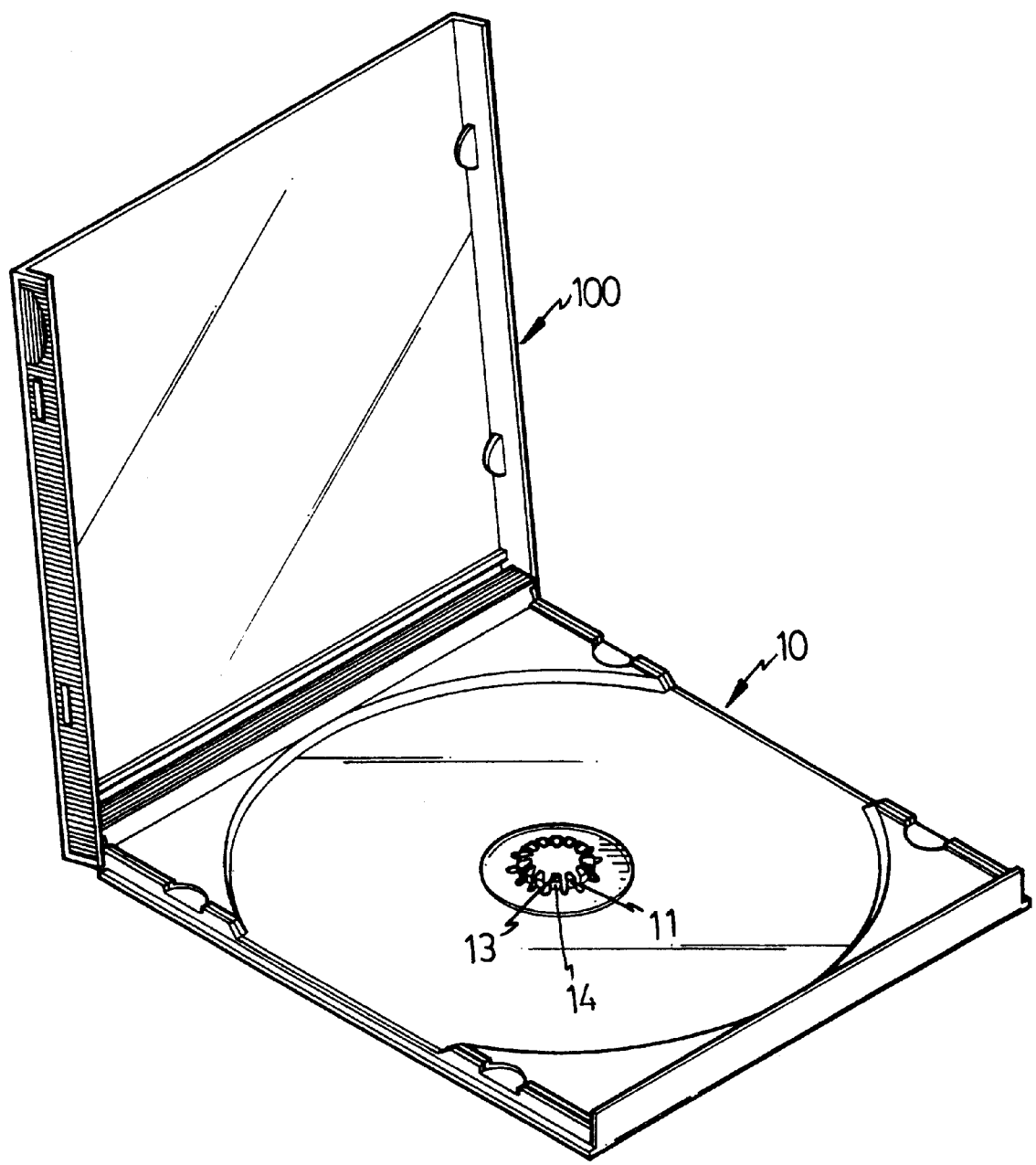
FIG. 1 is a perspective view of a conventional compact disk receiving device.
Figure 2:
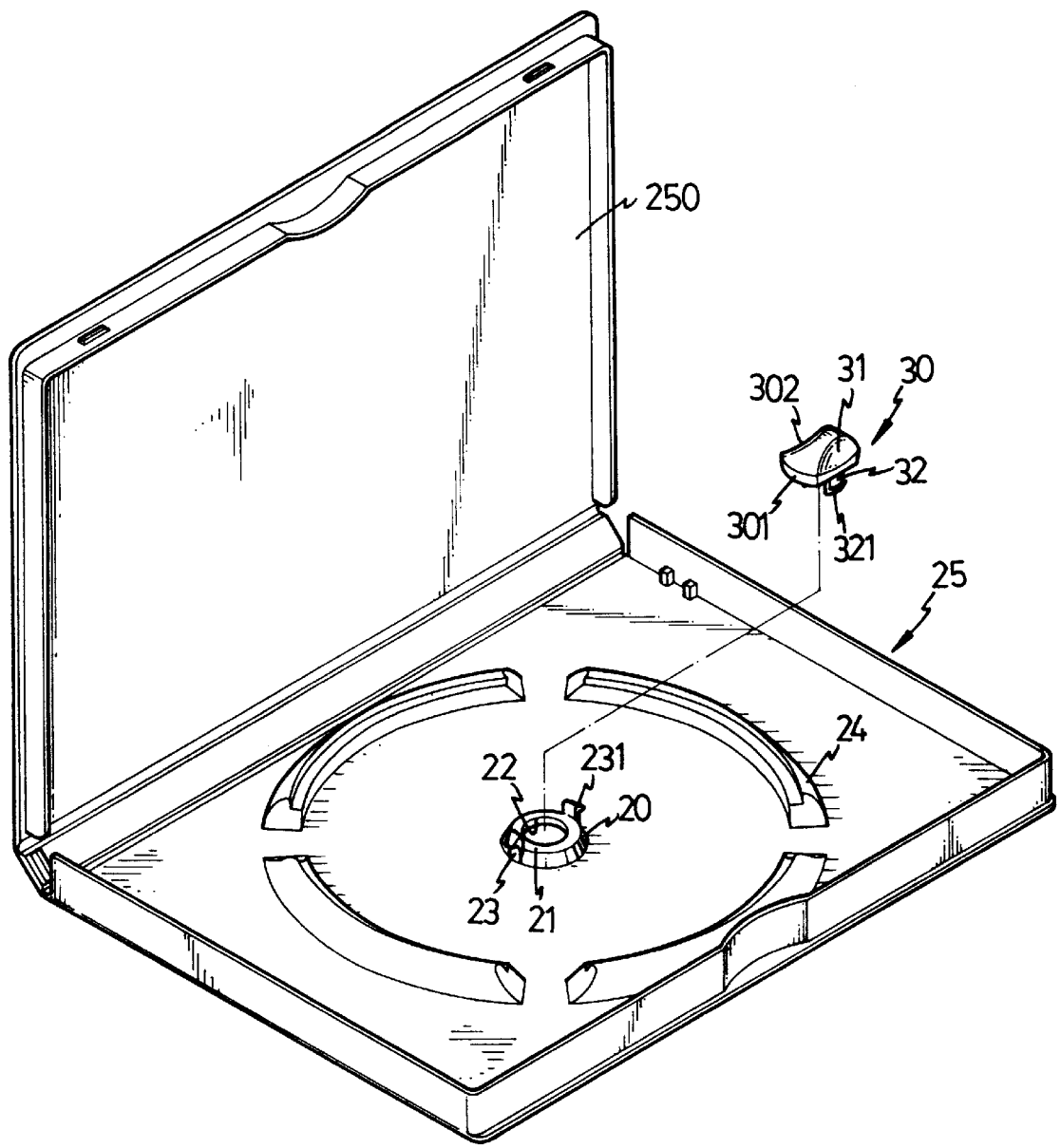
FIG. 2 is an exploded view of the compact disk receiving device in accordance with the present invention.
Figure 3:
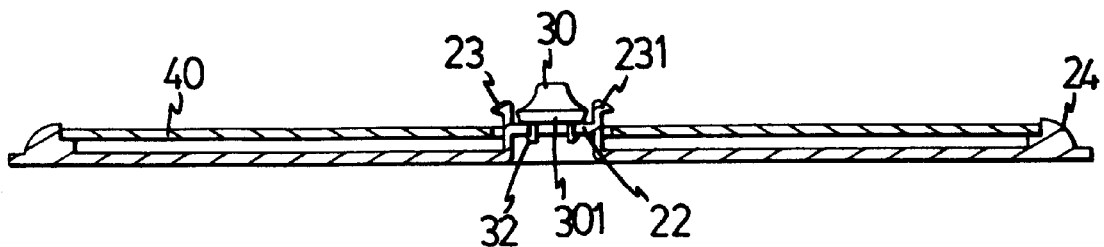
FIG. 3 is a side elevational view, partly in section, of the receiving device in accordance with the present invention, wherein the two hook members are not pushed by the engaging member mounted to the circular flange.

Referring to FIGS. 2 and 3, the compact disk receiving device in accordance with the present invention comprises a base plate (25) with a cover (250) pivotally connected thereto. A circular flange (20) extends from the top of the base plate (25) and a lip portion (22) extends radially inward from the inner periphery of the circular flange (20). Two hook members (23) respectively extend radially outward from the flange (20) and each of the hook members (23) has an inclined surface (231) defined in the top thereof. A compact disk (40) can be easily slid over the two inclined surfaces (231) and mounted to the circular flange (20). Therefore, the compact disk (40) is located between the top of the base plate (25) and the two hook members (23) as shown in FIG. 3.

An engaging member (30) is rotatably engaged with the circular flange (20) and has two engaging plates (32) extending from the bottom thereof so as to be engaged with the lip portion (22) of the flange (20). The engaging member (30) has a long side (302) and a short side (301), the length of the long side (302) is longer than the distance between the two hook portions (23), and the length of the short side (301) is shorter than the distance between the two hook portions (23).

Figure 4:
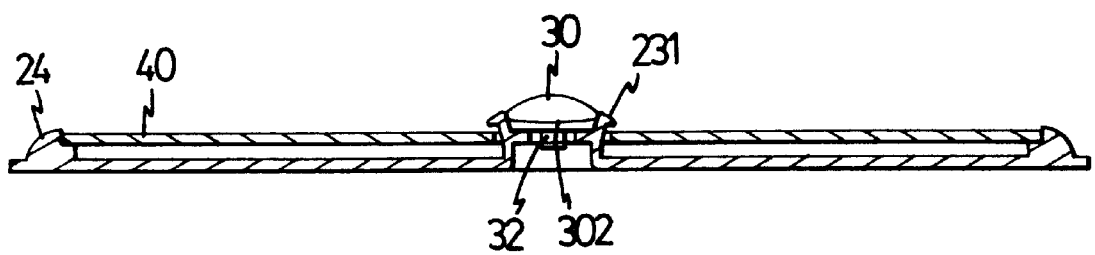
FIG. 4 is a side elevational view, partly in section, of the receiving device in accordance with the present invention, wherein the two hook members are pushed to compress the compact disk mounted to the circular flange by rotating the engaging member.

Referring to FIG. 4, the engaging member (30) is rotated to let the long side (302) thereof push the two hook members (23) radially outward so that the two hook members (23) extend to compress or limit the compact disk (40) from removing from the circular flange (20). When removing the compact disk (40), simply rotating the engaging member (30) in the opposite direction to release the push force from the long side (302) of the engaging member (30) and let the short side (301) be located between the two hook members (23). Because the length of the short side (301) is shorter than the distance between the two hook members (23) so that the two hook members (23) return to their original position and the compact disk (40) can be easily removed from the circular flange (20).

In order to enhance positioning feature for the compact disk (40), four curved ridges (24) extend from the top of the base plate (25) and are located as a circle which shares a common center with the circular flange (20). The diameter of the circle composed of the four curved ridges (24) is slightly larger than the diameter of the compact disk (40) so that even if the receiving device impacts something, the compact disk (40) is still well positioned.

By the receiving device of the present invention, the two hook members (23) are pushed or released simultaneously so that the compact disk (40) is conveniently picked from or receive in the receiving device.

While we have shown and described various embodiments in accordance with the present invention, it should be clear to those skilled in the art that further embodiments may be made without departing from the scope and spirit of the present invention.

What is claimed is:

1. A compact disk receiving device comprising:

a base plate (25) with a cover (250) pivotally connected thereto, a circular flange (20) extending from the top of said base plate (25) and two hook members (23) respectively extending radially outward from said flange (20), a lip portion (22) extending radially inward from the inner periphery of said circular flange (20), and an engaging member (30) rotatably engaged with said circular flange (20), said engaging member (30) having two engaging plates (32) extending from the bottom thereof so as to be engaged with said lip portion (22) of said flange (20), said engaging member (30) having a long side (302) and a short side (301), the length of said long side (302) is longer than the distance between said two hook portions (23), the length of said short side (301) is shorter than the distance between said two hook portions (23).

2. The device as claimed in claim 1, wherein each of said hook members (23) has an inclined surface (231) defined in the top thereof.

3. The device as claimed in claim 1 further comprising curved ridges (24) extending from the top of said base plate (25) and forming a circle which shares a common center with said circular flange (20).

* * * * *